United States Patent [19]

Zonneveld et al.

[11] Patent Number: 5,132,505
[45] Date of Patent: Jul. 21, 1992

[54] METHOD OF CLEAVING A BRITTLE PLATE AND DEVICE FOR CARRYING OUT THE METHOD

[75] Inventors: Maarten H. Zonneveld; Jacobus N. Dekker; Gerrit C. Verkade; Ireneus H. T. Fierkens; Theodorus J. M. J. Van Gennip, all of Eindhoven, Netherlands

[73] Assignee: U.S. Philips Corporation, New York, N.Y.

[21] Appl. No.: 664,073

[22] Filed: Mar. 4, 1991

[30] Foreign Application Priority Data

Mar. 21, 1990 [NL] Netherlands ............... 9000655

[51] Int. Cl.⁵ ................................. B23K 26/00
[52] U.S. Cl. ........................... 219/121.6; 65/105; 65/112; 219/121.85
[58] Field of Search ............ 219/121.67, 121.72, 219/121.6, 121.85, 121.78, 121.79, 121.65, 121.66, 121.6, 121.85, 121.68, 121.69; 65/105, 112; 125/30 R

[56] References Cited

U.S. PATENT DOCUMENTS

| 3,453,097 | 7/1969 | Hafner | 65/112 |
| 3,543,979 | 12/1970 | Grove et al. | 225/2 |
| 4,546,231 | 10/1985 | Gresser et al. | 219/121.72 |

Primary Examiner—C. L. Albritton
Attorney, Agent, or Firm—Paul R. Miller

[57] ABSTRACT

A method and a device for cleaving a plate of a brittle material, such as, for example, glass, by means of a radiation beam repeatedly moving over the plate. The radiation beam is repeatedly passed over a desired track until the plate has been cleaved along a desired line of rupture of the plate.

5 Claims, 2 Drawing Sheets

METHOD OF CLEAVING A BRITTLE PLATE AND DEVICE FOR CARRYING OUT THE METHOD

The invention relates to a method of cleaving a brittle plate, in which a radiation beam originating from a source of radiation is passed over a desired track of the plate, which beam produces thermomechanical stresses in the plate and causes, starting from a crack initiation, a crack to be formed along a desired line of rupture. The invention further relates to a device suitable for carrying out the method according to the invention.

BACKGROUND OF THE INVENTION

A method of the kind mentioned in the opening paragraph and a device for carrying out this method are known from U.S. Pat. No. 3,543,979. In this known method, a crack initiation is provided in a side of a glass plate, whereupon a laser beam is moved along a desired line of rupture. By means of the laser beam, thermal energy is produced in the plate, which energy produces thermomechanical stresses, as a result of which, starting from the crack initiation, a crack is formed. The crack follows the laser beam at a certain distance along the desired line of rupture until the laser beam has reached an end of the line of rupture. Due to the thermomechanical stresses in the plate, the crack then propagates further to the end of the desired line of rupture. This method has the disadvantage that the speed at which the crack propagates through the plate is limited in that the energy is produced in a comparatively small part of the track. Further, the quantity of energy produced in the plate per unit time must not be excessively large because the plate then locally softens, melts or burns.

The speed at which the laser beam is moved over the plate and the energy is produced in the plate must not be excessively high because in this case insufficient stress is built up in the plate to cleave the plate, as a result of which the crack cannot follow the laser beam. Upon the start of the crack, the maximum admissible speed of the laser beam is lower than during the further formation of the crack. In the known method, the control of the power in relation to the speed of the laser beam upon the start of the crack from the crack initiation and during the further formation of the crack is comparatively complicated.

SUMMARY OF THE INVENTION

The invention has for its object to provide a method by which in a simple manner a plate can be cleaved at a comparatively high speed along the desired line of rupture.

In the method according to the invention, this object is achieved in that the radiation beam is repeatedly passed over the track until the plate has been cleaved along the desired line of rupture. Thus, thermal power is produced in the plate along the whole track substantially at the same time, as a result of which thermomechanical stresses are produced in the plate, causing a crack to be formed along the desired line of rupture.

The radiation beam is repeatedly passed over the track. When in the plate sufficient thermomechanical stresses have been built up, a crack will occur starting from the crack initiation.

The speed at which the crack propagates along the desired line of rupture inter alia depends upon the quantity of thermal energy produced in the plate per unit time. This quantity of energy can be considerably larger than the quantity of energy of a radiation beam moving once over the track (as in U.S. Pat. No. 3,543,979) because the thermal energy is distributed over the whole track. As a result, the overall quantity of energy required for cleaving the plate is produced in the plate in a shorter time and a higher cleaving speed is attained. When a radiation beam is repeatedly passed over the track, the diameter of the radiation beam can be smaller than with a beam once moving over the track, s a result of which the crack extends more accurately along the desired line of rupture.

It should be noted that it is known from U.S. Pat. No. 3,587,956 to produce power at the same time over the whole track. By the method described in this Patent, stresses causing the formation of a crack along a desired line of rupture are produced in a plate over a desired track with the aid of a heated wire. However, this method suffers from a number of limitations; the distance between the wire and the track should be substantially constant along the whole track in order to guarantee a satisfactory heat transfer; the shape of the track can be modified only with difficulty and the surface of the plate heated by the wire is comparatively large, as a result of which the desired line of rupture is not followed accurately.

An embodiment of the method according to the invention is characterized in that the radiation beam is passed repeatedly over the desired track from one side of the plate to a certain distance from the other side of the plate, the crack cleaving the plate being completed within a part of the plate kept free or screened from the radiation beam.

Thus, it is prevented that in this part of the plate thermomechanical stresses are built up, which can cause a desired crack to be formed from an unevenness in this part of the plate or which make it difficult for the crack to propagate as far as the side of the plate.

A further embodiment of the method according to the invention is characterized in that a first radiation beam is passed repeatedly over a first desired track of a first glass plate belonging to a number of liquid crystal display devices (L.C.D.'s) and a second radiation beam is passed repeatedly over a second desired track of a second glass plate belonging to the liquid crystal display devices until the plates have been cleaved along a first and a second desired lines of rupture, respectively, which are located between two adjacent liquid crystal display devices. The glass plates of the liquid crystal display devices are arranged in parallel and are interconnected. By the method according to the invention, it is possible to split up a number of interconnected liquid crystal display devices in a simple manner into separate liquid crystal display devices.

Another embodiment of the method according to the invention is characterized in that the first and second lines of rupture, viewed in a projection on one of the plates, are located at a certain relative distance. Thus, when cleaving the plates, opposite parts of the plates are mutually separated. These parts are provided with connections of the liquid crystal display device, which in this manner become freely accessible.

The device suitable for carrying out the method according to the invention comprises a laser, a device for focusing a laser beam originating from the laser and a rotatable mirror for causing the laser beam to be passed over a track and is characterized in that during cleavage of a plate a part of an end of the desired line of rupture is screened from the laser beam by a shield. As a result, a trajectory over which the radiation beam is passed need not be adapted when a part of the plate should be kept free from the radiation beam. It has been found in practice that preferably a part of the desired line of rupture should always be kept free from the radiation beam.

The extent of radiation screening by the shield is determined by experiments in such a manner that the crack extends as far as the side of the plate and the initiation of an undesired crack from the part of the plate kept free is avoided.

BRIEF DESCRIPTION OF THE DRAWINGS

The invention will be described more fully with reference to a drawing, in which.

DESCRIPTION OF THE INVENTION

Figure 1:
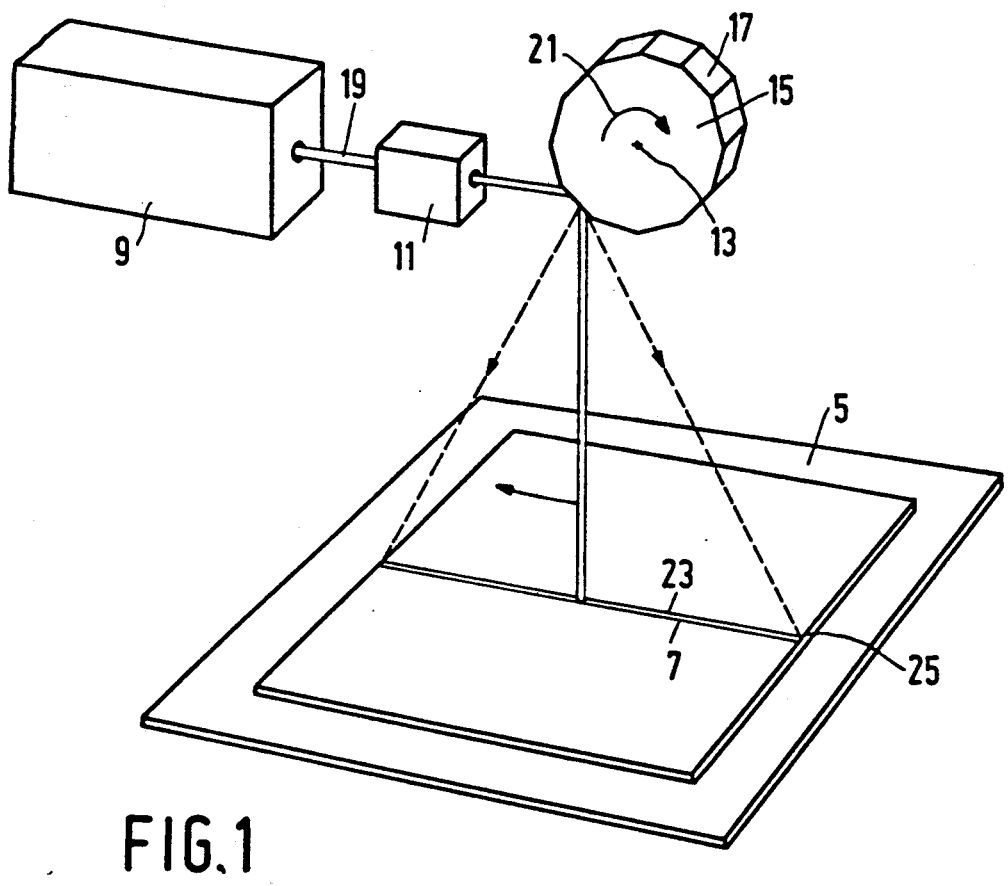
FIG. 1 shows diagrammatically a device suitable for carrying out the method according to the invention.

FIG. 1 shows a device 1 which is suitable for cleaving a plate 5 along a desired line of rupture 7. The device 1 comprises a laser 9, a laser beam narrowing or focusing element 11 and a disk 15 rotatable about an axis 13. The axis 13 of the disk 15 perpendicularly crosses the laser beam 19 originating from the laser 9. A side section of the disk 15 perpendicular to the axis 13 has the shape of a regular polygon. The disk 15 is provided with a number of mirror surfaces 17, which constitutes the sides of the polygon. A normal vector n of the mirror surface 17 is perpendicular to the axis 13 of the disk 15. The laser beam 19 is reduced by the laser beam narrowing or focusing element 11 to the desired diameter and is then deflected by a mirror surface 17 away from the disk 15 in the direction of the plate 5 to be cleaved. The disk 15 is driven by an electric motor (not shown) and rotates about the axis 13 in the direction of the arrow 21. By reflection of the laser beam 19 on one of the rotating mirror surfaces 17, a track 23 is described by the laser beam 19 over the plate 5 to be cleaved. When the disk 15 rotates, the laser beam 19 is passed repeatedly over a track 23 of the plate 5. By the laser beam 19, in the plate 5 thermomechanical stresses are produced, which cause a crack to be formed, starting from a crack initiation 25. This beam 19 is repeatedly passed over the track 23 until the crack has propagated along the whole desired line of rupture 7.

The track 23 over which the laser beam 19 is repeatedly passed should be defined so that the thermomechanical stresses are symmetrical around the line of rupture, as a result of which the plate 5 is cleaved along the desired line of rupture 7. Especially when a plate is split up into two parts having different dimensions, the track will not coincide with the desired line of rupture. For determining the correct track, use may be made of the method described in Netherlands Patent Applications 8901143 and 8901144 in the name of N. V. Philips' Gloeilampenfabrieken.

The speed at which the crack is formed in the plate 5 inter alia depends upon the power of the laser beam passing over the plate and upon the size of the crack initiation 25. The crack initiation may be an unevenness already present in the plate or a scratch provided in the plate by means of a sharp object.

When a comparatively small crack initiation has been provided in the plate, the time passing before sufficient thermomechanical stresses have been built up around the crack initiation for starting the crack is comparatively long. In this time, stresses are also built up in the remaining part of the plate. When the crack starts, the crack is displaced at a comparatively high speed through the plate.

When a comparatively large crack initiation has been provided in the plate, the time passing before the crack starts is shorter, while smaller thermomechanical stresses are built up in the plate and the crack is displaced at a lower speed through the plate. Due to the lower speed, the crack follows the desired line of rupture more accurately.

When cleaving a plate of calcarious glass (soda-lime), use was made of a $CO_2$ laser having a wavelength of 10.6 $\mu$m and a power applied to the plate of 400 W. The laser beam had a diameter of 2 mm at the area of the plate. A disk with twelve mirror surfaces was rotated at a speed of 200 rev/sec so that the frequency at which the laser beam was passed over the plate was 2400/sec. The plate having dimensions of $350 \times 320 \times 1$ mm was provided with a crack initiation at the center of a side; the laser beam was passed along a desired line of rupture located symmetrically in the plate. The crack propagated through the plate within 5 seconds.

Figure 2:
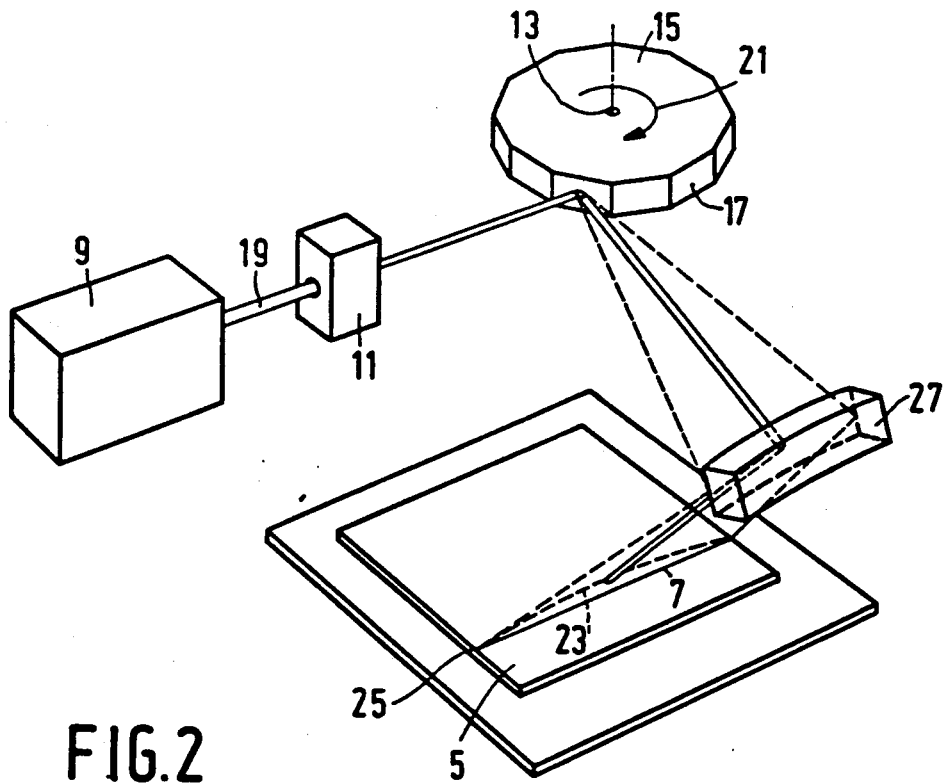
FIG. 2 shows diagrammatically another device suitable for carrying out the method according to the invention.

FIG. 2 shows another device 2 suitable for carrying out the method according to the invention. The parts corresponding to FIG. 1 are provided with the same reference numerals.

A laser beam 19 originating from a laser 9 is passed via a beam narrowing element 11, a disk 15 is provided with mirror surfaces 17 and a fixedly arranged curved mirror 27 is provided over the plate to be cleaved. The curved mirror 27 has a concave mirror side facing the plate and the disk 15. A normal vector n of the curved mirror surfaces encloses an angle of less than 90° with the laser beam, which is deflected by the disk 15 onto the curved mirror 27 and encloses an angle of less than 90° with the surface of the plate 5. By the curved mirror 27, the laser beam 19 is passed along the curved track 23 on the plate 5. The plate 5 is cleaved along a line of rupture 7 located asymmetrically in the plate. The track 23 along which the thermal energy is produced in the plate is defined so that the thermomechanical stresses are symmetrical along the desired line of rupture 7 in order to avoid deviations of the crack with respect to the desired line of rupture.

Figure 3:
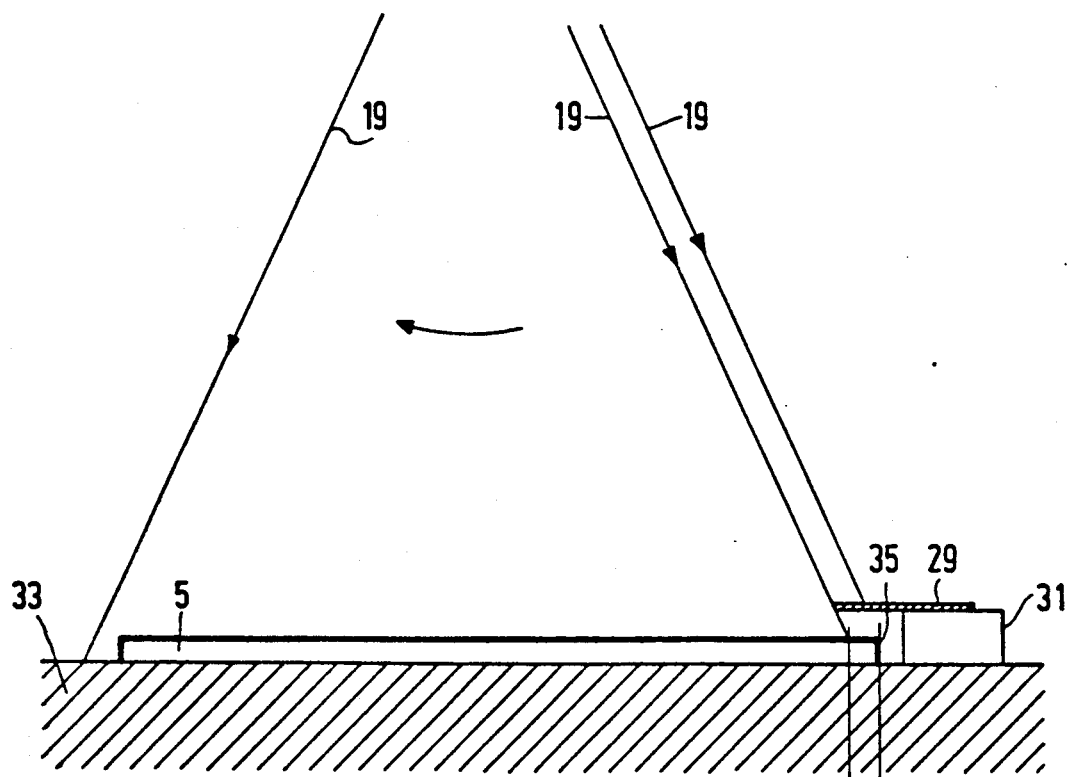
FIG. 3 shows diagrammatically a part of a device according to the invention.

FIG. 3 shows a device 3 according to the invention, in which the laser beam 19 is prevented by a shield 29 from being passed over the whole plate 5 to be cleaved.

The shield 29, for example an anodized aluminium plate, is connected via a support 31 to a frame 33. The plate 5 which has to be cleaved along a desired line of rupture is located on the frame 33. The laser beam 19 is passed repeatedly over the plate 5, but it is not passed over a part of the plate in order to avoid an undesired start of the crack from an unevenness, such as, for example, a scratch or an inhomogeneity in that part of the plate. Thus, it further becomes simpler for the crack to propagate to the side 35. The distance S over which the laser beam is prevented from being passed over the plate is determined by experiments.

Figure 4:
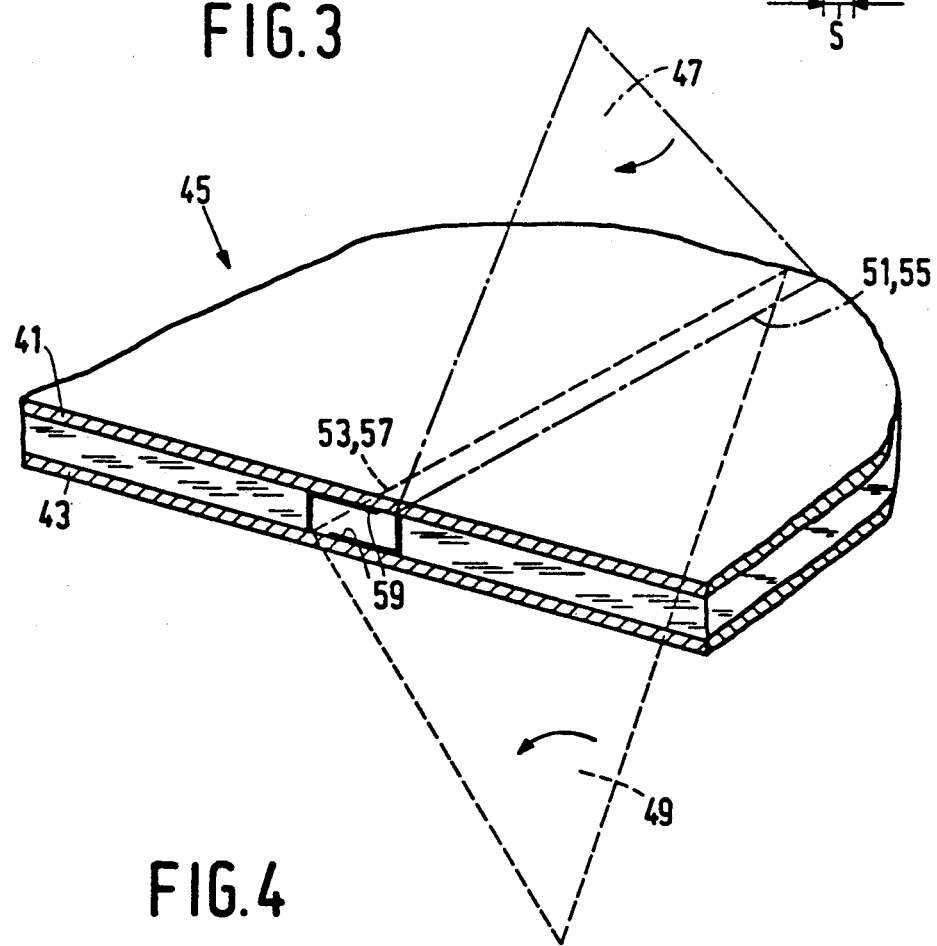
FIG. 4 shows a number of interconnected liquid crystal display devices, which are split up into separate liquid crystal display devices.

FIG. 4 shows first and second plates 41, 43, which belong to a number of interconnected liquid crystal display devices 45. First and second radiation beams 47, 49 are passed over the first and second plates 41 and 43, respectively, along first and second desired tracks 51 and 53, respectively. This may be effected, for example, by two devices 1 arranged on either side of the liquid crystal display devices 45 or by splitting a laser beam originating from a laser into two beams and causing these beams to pass via drums arranged on either side of the liquid crystal display devices 45 along the desired tracks 51, 53. The plates 41, 43 are cleaved, along the desired lines of rupture 55 and 57, respectively, which are located in a projection on one of the plates at a certain relative distance. As a result, connections 59 become freely accessible.

In order to cleave brittle plates in a controlled and reproducible manner, it is recommended to provide a crack initiation in the plate instead of using an unevenness already present in the plate as crack initiation.

Instead of a laser, other radiation sources, such as infrared sources and halogen lamps, may also be used. For cleaving a plate, a radiation source should be chosen having a wavelength that is fully absorbed by the plate to be cleaved.

The direction of rotation of the disk 15 may be chosen at will. The radiation beam may be passed repeatedly over the plate also by means of a mirror tilted to and fro about an axis.

The curvature of the curved mirror 27 depends upon the desired track along which the radiation beam is passed. Besides flat plates, also objects having a curved surface may be cleaved by the method according to the invention. However, the radiation beam must be capable of passing along the desired track.

The material of the plate to be cleaved should be brittle. This means that it should have a comparatively low $K_{IC}$ value. As examples of brittle materials are mentioned glass, ceramic material and silicon.

We claim:

1. A method of cleaving a brittle plate in which a radiation beam originating from a source of radiation is passed over a desired track of the plate, which beam produces thermomechanical stresses in the plate and causes, starting from a crack initiation, a crack to be formed along a desired line of rupture, characterized in that the radiation beam is passed repeatedly over the track until the plate has been cleaved along the desired line of rupture, and characterized in that a first radiation beam is passed repeatedly over a first desired track of a first glass plate belonging to a number of liquid crystal display devices and a second radiation beam is passed repeatedly over a second desired track of a second glass plate belonging to the liquid crystal display devices until the plates have been cleaved along a first and a second desired line of rupture, respectively, which are located between two adjacent liquid crystal display devices.

2. A method as claimed in claim 1, characterized in that the first and second lines of rupture, viewed in a projection on one of the plates, are located at a certain relative distance.

3. A method of cleaving a brittle plate comprising the steps of
   (a) locating an initial crack at an edge surface of a brittle plate,
   (b) producing thermomechanical stresses in said plate along a track starting from said initial crack by repeatedly passing a radiation beam over said track, and
   (c) continuing said step of repeatedly passing said radiation beam along said track until a crack is formed cleaving said plate along a rupture line.

4. A method according to claim 3, wherein said rupture line extends from one side of said plate to another side of said plate, wherein said step of repeated passing said radiation beam is carried out to only a given distance from said another side, and wherein cleaving of said plate along said rupture line is thereafter completed within the part of said plate kept free of said radiation beam.

5. A device for cleaving a plate comprising
   (a) laser means for producing a laser beam,
   (b) focussing means for focussing said laser beam,
   (c) rotatable mirror means for repeatedly passing said laser beam over a track on a surface of a brittle plate until a crack is provided to cleave said plate along a rupture line, and
   (d) screening means for shielding a part of said rupture line from said laser beam.

* * * * *